July 23, 1935.   F. F. STEINER   2,009,032
CUTTING TOOL
Filed July 9, 1934
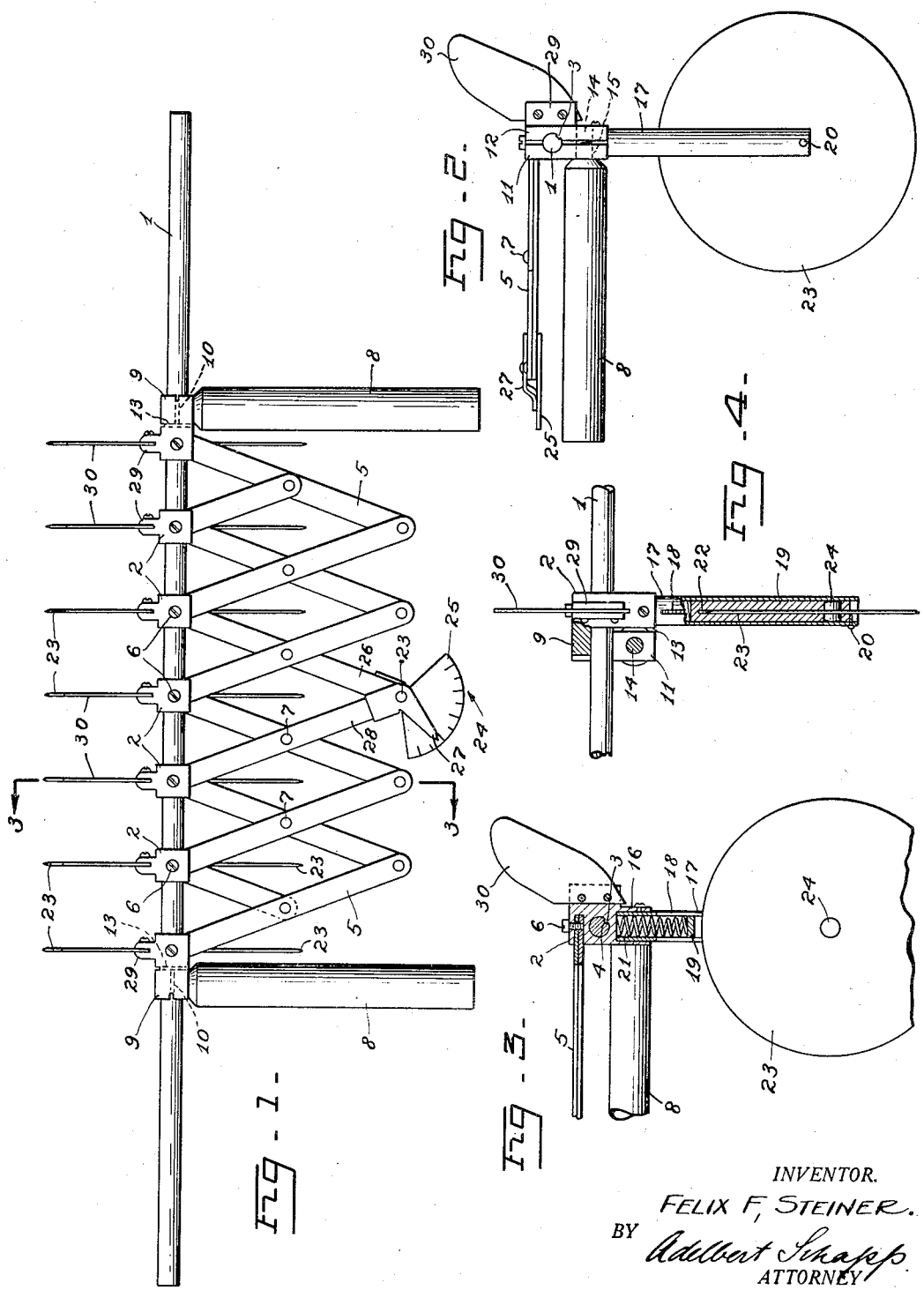
INVENTOR.
FELIX F. STEINER.
BY Adelbert Schapp
ATTORNEY Patented July 23, 1935

2,009,032

UNITED STATES PATENT OFFICE 2,009,032

CUTTING TOOL

Felix F. Steiner, Santa Cruz, Calif.

Application July 9, 1934, Serial No. 734,282

6 Claims. (Cl. 107—51)

The present invention relates to improvements in cutting tools and its principal object is to provide a cutting tool to be principally used in bakeries for cutting doughs, sheet cakes and the like along parallel lines so as to produce strips of equal width.

A further object of the invention is to arrange the cutting tool in such a manner that it may be readily adjusted for cutting strips of varying width.

A further object of the invention is to arrange a plurality of cutting discs in coaxial relation for cutting the dough or other material, the discs being mounted so that their spacing may be readily adjusted, and each disc being held to the surface on which the dough is disposed by spring action so that it may yield to compensate for unevenness in the surface.

A further object of the invention is to provide a disc assembly of the character described in which the assembly may be manipulated by means of two spaced handles which are used at the same time for effecting a change in the spacing of the discs and have also means associated therewith for locking the discs in adjusted relation.

It is further proposed in the present invention to provide markers in combination with the cutting discs for marking the dough or material at spaced points, with the same freedom of adjustment of the spacing between the markers.

It is further proposed to provide in combination with the disc cutters and the markers a gauge which automatically indicates the spacing between the cutters or markers.

It is further proposed to provide structural improvements intended to facilitate the manufacture and operation of my cutting tool and to render its operation efficient and economical.

Further objects and advantages of my invention will appear as the specification proceeds.

The preferred form of my invention is illustrated in the accompanying drawing in which Figure 1 shows a top plan view of my cutting tool, Figure 2 an end view of the same, Figure 3 a vertical section through the device taken along line 3—3 of Figure 1, and Figure 4 a front view of a single cutting unit, portions being shown in section.

While I have shown only the preferred form of my invention it should be understood that various changes or modifications may be made within the scope of the claims hereto attached without departing from the spirit of the invention.

Referring to the drawing in detail, the rod 1, which is horizontal when the device is in working position on a horizontal surface, has a plurality of blocks 2 slidable thereon, the blocks being held against rotation on the rod by small ribs 3 entering a groove 4 in the rod or by any other suitable means. The blocks are held in uniformly spaced relation on the rod by means of lazy tongs 5 which are well known in the art and therefore need not be specifically described. In the drawing the blocks are shown as being pivoted, as at 6, at the ends of the lazy tongs but, if desired, they might be pivoted to the centers 7 of the lazy tongs. It will be noted that the lazy tongs will maintain the blocks in evenly spaced relation but will allow the spacing to be adjusted at will. This adjustment may be effected by means of the handles 8 which extend at right angles from the end blocks in parallel relation to one another.

The end blocks are formed somewhat differently from the intermediate blocks insofar as they have extensions 9 along the length of rod which are split longitudinally, as shown at 10, the split extending, in its lower portion, throughout the length of the extension while in its upper portion it only extends through a portion of the material. The split thus divides the extension into two sections 11 and 12 which are held together above the rod by that portion of the extension which is not split. One of the sections, 12, is separated in its lower portion, that is below the rod, from the body of the block, by a second, transverse slit 13 so that this section is free to be drawn toward its companion section by means of the handle 8, which has a reduced extension 14 passing through an aperature 15 in the section 11 and threaded into the section 12. It will thus be seen that by a slight turning movement of the handle in one direction the two sections 11 and 12 may be firmly clamped upon the rod for locking the end block against endwise movement while a reverse turning movement of the handle will loosen the engagement and render the end block free to move along the rod.

Each of the blocks has a cylindrical downward extension 16 at right angles to the handles and these extensions receive the tubes 17 which project downwardly therefrom and are of uniform length. These tubes are formed with diametrically opposed slots 18 extending from the bottom end to within close proximity of the top end. Each tube has a shaft 19 slidable therein, the downward movement of the shaft being limited by a small set screw 20 threaded radially into the tube near its bottom end. The shaft has a spring 21 bearing on the upper end thereof and is urged downward thereby.

The shaft is also provided with a diametrical slot 22 in which the disc cutter 23 is free to revolve, the cutter being mounted on the pivot 24 near the lower end of the shaft. The slot 22 is alined with the slots 18 in the tube and is held in alinement by the disc cutters. The tubes and the shafts being all of the same length, the discs normally assume a position of axial alinement but each disc is free to move with its supporting shaft within the tube to compensate for unevenness in the surface on which the dough or other material is disposed.

The lazy tongs, as is well known in the art, consist of a plurality of links interconnected to form a series of collapsible and expansible parallelograms and two of these links, pivoted together at 23, are made to support and operate a gauge 24 comprising a sector-shaped dial 25 secured to the link 26 so that the center point of the sector coincides with the pivot 23 and a pointer 27 secured to the link 28 to as to turn about the same pivot. The dial is graded to indicate the spacing between the discs at any given position of the latter.

The blocks 2 are formed with forwardly extending flanges 29 defining a slot therebetween and markers 30 are supported in the slots so as to project in a forward and upward direction, the markers being of the shape indicated in the drawing.

The device is operated as follows: First the desired spacing is obtained for the disc cutters. A slight turning movement of the two handles 8 loosens the grip of the extensions 9 of the end blocks on the rod and allows the said blocks to slide along the rod. The end blocks are now moved by means of the handles until the pointer 27 indicates on the dial the desired spacing. The lazy tong connection between all the blocks causes the intermediate blocks to uniformly move with the end blocks so that the spacing for all the blocks remains uniform throughout. A turning movement of the handles in the opposite direction clamps the extensions 9 on the rod and thereby locks all the blocks on adjusted position.

The device is now placed on the dough or other material to be cut and is then advanced so as to cut the dough into a plurality of strips of uniform width. The operator guides the device by means of the handles 8 and exerts downward pressure. Most of the bakery tables which have been used for some time are uneven in surface, but the discs, due to their spring-pressure mounting are able to follow the uneven surface and to remain in contact therewith so that the dough or other material is cut by each disc clear to the bottom whereby a clean cut is obtained.

When it is desired to merely mark the dough instead of actually cutting the same, the device, after the proper spacing has been obtained in the manner previously described is turned upside down whereupon the markers 30 are impressed upon the material.

If it should be found desirable to widen the slots 18 in the tubes 17 so as to give the discs more clearance, some other means should be provided for holding the shafts 19 against turning movements in the tubes 17, for which purpose several conventional arrangements are available as for instance a screw threaded into the sleeve riding in a longitudinal slot provided in the shaft.

I claim:

1. A cutting tool of the character described, comprising a rod, a plurality of blocks slidable thereon and having parallel prongs projecting therefrom, rotary cutters supported in the prongs, and lazy tongs for uniformly spacing the blocks on the rod, the lazy tongs projecting from the blocks in angular relation to the prongs so as to leave the latter free to receive the cutters in close proximity to the rod.

2. A cutting tool of the character described, comprising a rod, a plurality of blocks slidable thereon and including two end blocks, a lazy tong connection between the blocks whereby the spacing between the same may be uniformly increased and decreased, prongs projecting radially from the blocks at right angles to the lazy-tongs, rotary cutters supported in the prongs in close proximity to the rods and handles projecting radially from the end blocks at right angles to the prongs.

3. A cutting tool of the character described, comprising a rod, a plurality of blocks slidable thereon and including two end blocks, a lazy tong connection between the blocks whereby the spacing between the same may be uniformly increased and decreased, prongs projecting radially from the blocks at right angles to the lazy-tongs, rotary cutters supported in the prongs in close proximity to the rod and handles projecting radially from the end blocks at right angles to the prongs and spaced from the plane of the lazy-tongs.

4. A cutting tool of the character described, comprising a rod, a plurality of blocks slidable thereon and including two end blocks, a lazy-tong connection between the blocks whereby the spacing between the same may be uniformly increased and decreased, prongs projecting radially from the blocks at right angles to the lazy-tongs, rotary cutters supported in the prongs in close proximity to the rod and handles projecting radially from the end blocks at right angles to the prongs with markers projecting in an inclined direction opposite the handles to aid in balancing the tool.

5. A cutting tool of the character described comprising a rod, a plurality of blocks slidable thereon, prongs projecting downwardly from the blocks, rotary cutters supported in the prongs, the blocks having horizontal slits above the rod, and a set of lazy-tongs pivoted in the slits so as to lie in a horizontal plane above the rod.

6. A cutting tool of the character described comprising a rod, a plurality of blocks slidable thereon including a pair of end blocks, prongs projecting downwardly from the blocks, rotary cutters supported in the prongs, the blocks having horizontal slits above the rod, a set of lazy-tongs pivoted in the slits so as to lie in a horizontal plane above the rod, outward extensions on the end blocks and horizontal handles secured in the extensions so as to lie outside the end blocks and in a horizontal plane below the rod.

FELIX F. STEINER.